Figures 1, 5:
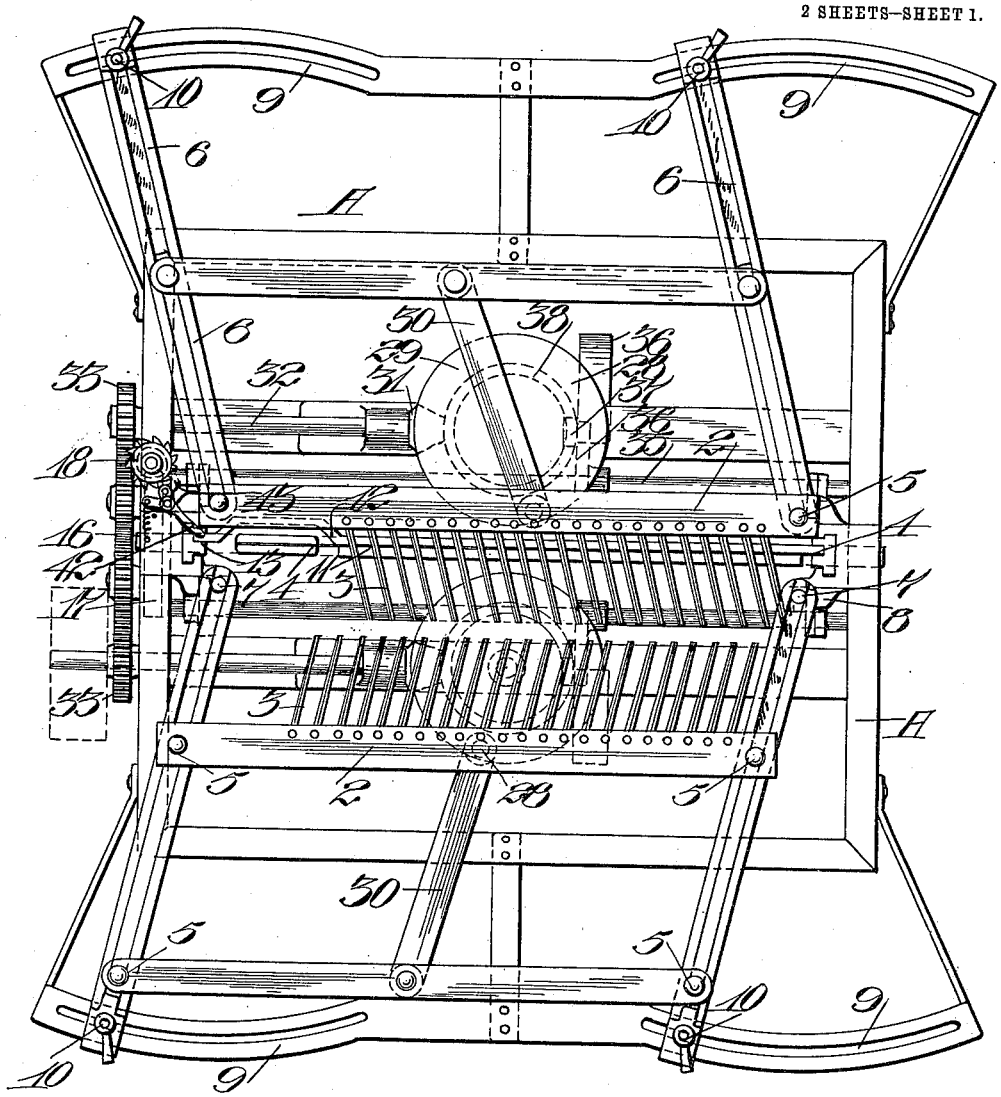

C. F. HOBSON.
SAW FILING MACHINE.
APPLICATION FILED JULY 5, 1910.

997,817.

Patented July 11, 1911.

2 SHEETS—SHEET 1.

Witnesses;
F. E. Maynard
T. Kastberg

Inventor;
Charles F. Hobson,
By G. H. Strong.
his Atty.

C. F. HOBSON.
SAW FILING MACHINE.
APPLICATION FILED JULY 5, 1910.
997,817.
Patented July 11, 1911.
2 SHEETS—SHEET 2.
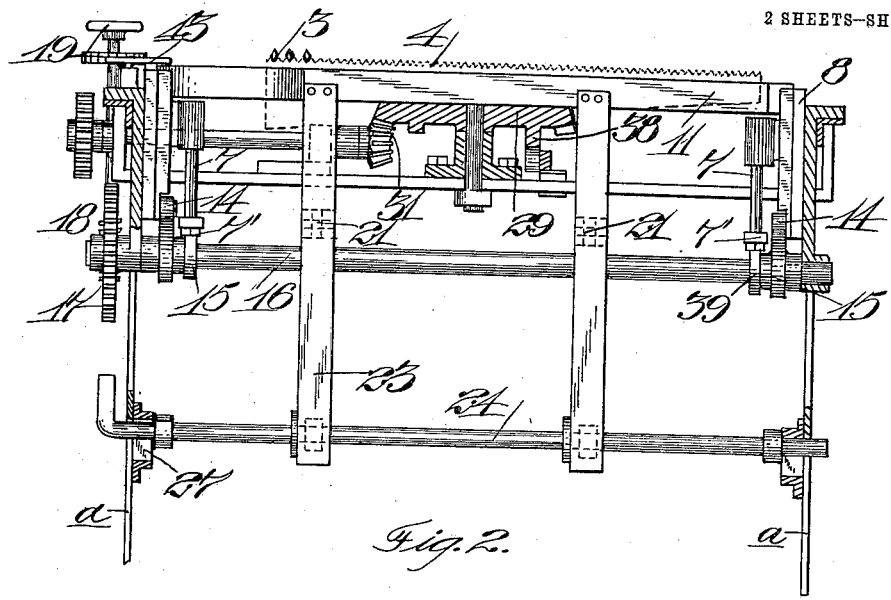
Fig. 2.
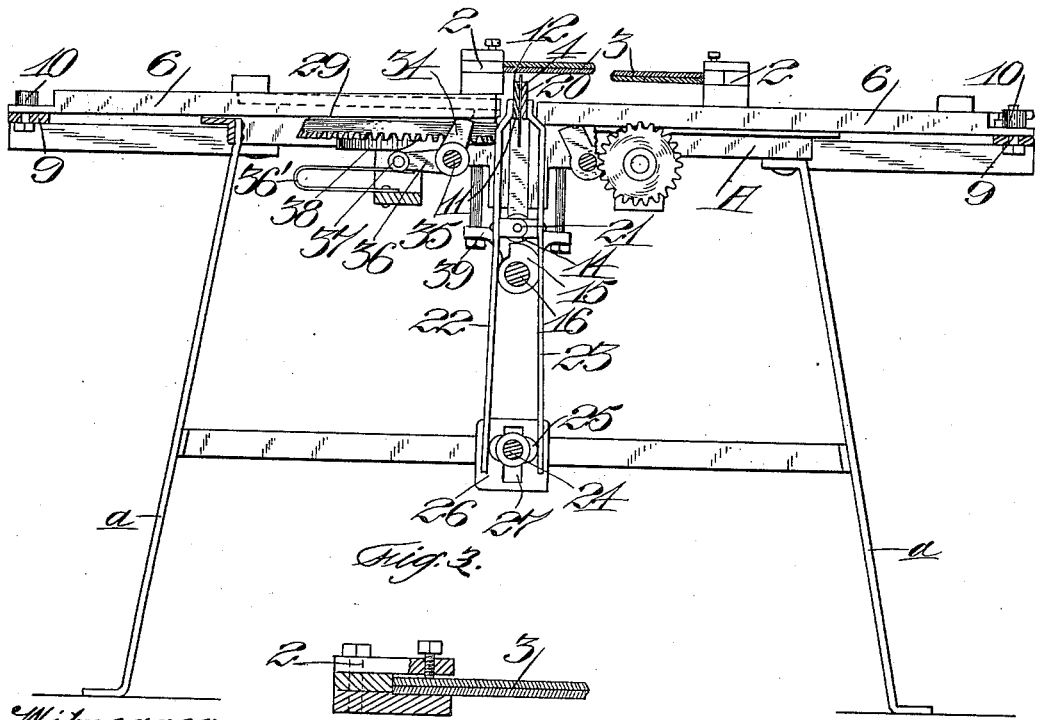
Fig. 3.
Fig. 4.
Witnesses:
F. E. Maynard
T. Eastberg
Inventor:
Charles F. Hobson;
G. H. Strong
Atty

UNITED STATES PATENT OFFICE.

CHARLES F. HOBSON, OF ST. HELENA, CALIFORNIA.

SAW-FILING MACHINE.

997,817.  Specification of Letters Patent.  Patented July 11, 1911.

Application filed July 5, 1910. Serial No. 570,449.

*To all whom it may concern:*

Be it known that I, CHARLES F. HOBSON, citizen of the United States, residing at St. Helena, in the county of Napa and State of California, have invented new and useful Improvements in Saw-Filing Machines, of which the following is a specification.

This invention relates to saw filing machines.

The purpose of my invention is to provide a simple, automatic saw-sharpening machine, whereby saws of various kinds may be sharpened with facility and inexpensively, and particularly in which machine the files will be adapted to act with graduated pressure during their stroke and to be entirely lifted from the saws on their return stroke after the manner of hand sharpeners; and also to provide means for automatically elevating the saw step by step as the filing proceeds, so the files cut a uniform amount at each operation.

The invention consists of the parts and the construction and combination of parts as hereinafter more fully described and claimed, having reference to the accompanying drawings, in which—

Figure 1 is a plan view of the machine. Fig. 2 is a central, vertical section, longitudinally of the machine. Fig. 3 is an end view partly in section. Fig. 4 is a detail of the file clamp. Fig. 5 is a detail showing a modified form of slide lift and lock.

The illustrated embodiment of my invention, representing a form of a machine actually and successfully operated, comprises a suitable frame A, supported on appropriate legs *a*. Upon this frame is mounted a pair of reciprocable carriages 2, adapted to receive and carry sets of files 3. The files in each set are angularly and relatively disposed so that all in one set engage alternate teeth in a saw 4, while the files of the other set engage the remaining teeth. Thus by moving the files back and forth across the saw the same will have its teeth all evenly and simultaneously cut.

To accomplish the adjustment and angular motion of the files relative to the saw, the file carriers are made in the form of a flexible parallelogram by having their end and side members pivotally connected, as at 5. The end bars of each carriage 2 have a sliding fit in radius arms 6, which are pivoted at 7 to suitable journal blocks 8 secured centrally at opposite sides of the frame A. Thus each flexible carriage 2 may be adjusted to the desired angle by means of their respective slide-arms 6, these being maintained in parallelism by reason of the engagement of the carriage ends, and the outer ends of the slide-arms 6 are perforated and locked to complementary slotted rails 9, secured on each side of the frame A, by locks 10. Centrally and longitudinally disposed within the frame A so that the file carriers may reciprocate toward its sides is a suitable vise 11, vertically slidable in the blocks 8, whereby the saw 4 may be clamped firmly while the files are swept over its edge to cut teeth.

A very simple and effective vise is obtained by securing ends of a bar or jaw 12 in slides 13 movable in the blocks 8, each vise-slide being provided at its lower end with a roller 14 adapted to bear upon suitable cams 15 secured on a center shaft 16, journaled in the blocks 8. On the outer end of the shaft is fastened a gear 17, engaging a worm or screw 18, turnable by a wheel 19, enabling the cam shaft to be slowly turned so as to lift the vise as the sharpening proceeds. The vise also includes a movable jaw 20, which is hinged at 21 to spring levers 22, of the fixed jaw 12, the spring levers depending below and free of the cam shaft.

Coacting arms 23 are secured to the loose jaw 20, and between adjacent arms 22—23 extends a rocker lock shaft 24 bearing double cams 25 which, when turned vertically, release the coöperative spring arms, and when turned horizontally swing the vise jaws tightly together to clasp the inserted saw. Now if the vise be raised by the cams 15 the friction of the arms 22—23 (Fig. 3) on the lock cams 25 will tend to lift the shaft 24, so as to permit this, its bearings 26 being slotted at 27.

After a saw has been placed in the vise and clamped, the operation is as follows:— Each outer bar of the file carrier is connected to a respective crank pin 28 of a gear 29 by a pitman 30, and power is transmitted to the crank through suitable gears 31 and shafts 32, the latter being properly turned by means of gears 33, so that the cranks work the carriers uniformly in opposite directions, i. e., when one set of files is moving toward the saw the other set is moving away. It is essential, after a set of files has made its cut across the saw, to lift the files therefrom so that they will make the return motion clear or free of it, while the other set of files is advanced in a plane to encounter and cut the edge of the saw. This alternate engagement and release of the files are accomplished by mounting below each pivoted end of the guide arms 6 suitable cams 34 on the rocker shafts 35 journaled in the frame A and having levers 36 bearing rollers 37 adapted to be actuated by appropriate cam-surfaces 38 of gears 29. Springs 36' hold the rollers against the cams 38. Each of the cams 38 is so set that its relative lever 36 is depressed to lift correlated arms 6 as the crank 28 pulls the files from the saw, while the opposite set of files is lowered into engagement by the other cam 38. In order to make the elevation and depression of the file sets simultaneous and positive the pivots 7 are formed with heads 7' upon which rest yokes 39 loosely mounted on the shaft 16, and when one file carrier is lifted by its cam 38 the pivot 7 is pulled up and this rocks the yokes 39, thus pulling down the pivots of the other slide 6.

Fig. 5 illustrates a modified form of means for pulling down and locking the pivots 7. This comprises a spring 40, surrounding the pivot and reacting downwardly against the head 7'. A lock bolt 41 is connected to the lifting cams 34, which pulls the bolt from its socket 42 in the pivot just before the guide 6 is lifted. Either the yoke 39 or the lock 41 will securely hold the files down against the saw when the cutting stroke is being made. The saw 4 is automatically fed upwardly as the work proceeds by the engagement of one carrier 2 with a lever 42 carrying a pawl 43 engageable with the feed wheel 19. Thus each time the carrier 2 completes its cut and starts back, the lever 42 gives the wheel 19 a slight turn, which, through the worm 18, turns the cam shaft 16.

Having thus described my invention, what I claim and desire to secure by Letters-Patent, is—

1. In a saw filing machine, the combination of a saw-holder comprising a jaw vertically movable in the frame of the machine, a loose jaw connected to the complementary jaw, means for closing the jaws upon a saw, means for raising the vise, file carriers reciprocable to and from the saw, and mechanism whereby the vise is automatically raised by the reciprocation of the file carrier.

2. In a saw filing machine, a vertically slidable vise, comprising a jaw secured in slides, a swinging jaw connected thereto, and means whereby said jaw may be closed against a saw, said means comprising spring arms secured to the vise jaws, a shaft passing between the arms, and cams on the shaft adapted to engage and spread the arms to close the vise.

3. In a saw filing machine, the combination of a vertically guided saw-vise, means for closing the jaws of said vise, means for raising the vise, file carriers reciprocable to and from the saw, and mechanisms whereby the vise is automatically raised by and during the reciprocation of the file carrier.

4. In a saw filing machine, the combination of opposite gangs of files, flexible carriers therefor, a frame having adjustable slide arms in which said carriers are reciprocable, a saw vise slidably mounted in the frame, spring levers connected to the vise, means to actuate said levers, mechanism whereby the file carriers may be actuated, and a vise raising device intermittently operated by one of the file carriers.

5. In a saw filing machine, the combination of opposite sets of files, angularly adjustable reciprocating carriers therefor, slotted arms for the carriers to move in, a saw support and means for giving the saw support a step by step upward movement automatically and synchronously with the reciprocating movement of the carriers, said last named means including a shaft, a lifting cam thereon, and connections between the shaft and the file carriers for operating said shaft.

6. In a saw filing device, the combination of a suitable saw support, two jointed file frames with file holding means, each of said frames being substantially in the form of a parallelogram and having its sides pivotally connected to its ends, one of said frames arranged on one side of the saw support and the other arranged on the other side, a shaft and connections therefrom for giving the frames an alternate reciprocating movement, and a second shaft operated by the reciprocations of the frame, said second shaft having cams for giving the saw support a step by step upward movement automatically and synchronously with the reciprocating movement of the file frames.

7. In a saw filing device, the combination of a suitable saw support, two jointed file frames with file-holding means, each of said file frames being substantially in the form of a parallelogram, and having its sides pivotally connected to its ends, one of said frames arranged on one side of the saw support and the other arranged on the other side, means for giving the frames an alternate reciprocating motion, means for giving the files a limited movement in a plane transverse of the plane of oscillation of the files, and means for giving the saw support a step by step upward movement automatically and synchronously with the reciprocating movement of the frames.

In testimony whereof I have hereunto set my hand in the presence of two subscribing witnesses.

CHARLES F. HOBSON.

Witnesses:
F. T. MOONEY,
ISAAC DUNING.

Copies of this patent may be obtained for five cents each, by addressing the "Commissioner of Patents, Washington, D. C."